United States Patent
Klein et al.

(10) Patent No.: US 8,842,884 B2
(45) Date of Patent: Sep. 23, 2014

(54) METHOD AND DEVICE FOR LANE DETECTION

(75) Inventors: Wladimir Klein, Lindau (DE); Michael Walter, Widnau (CH)

(73) Assignee: Conti Temic Microelectronic GmbH (DE)

( * ) Notice: Subject to any disclaimer, the term of this patent is extended or adjusted under 35 U.S.C. 154(b) by 54 days.

(21) Appl. No.: 13/258,080

(22) PCT Filed: Mar. 18, 2010

(86) PCT No.: PCT/DE2010/000303
§ 371 (c)(1),
(2), (4) Date: Dec. 1, 2011

(87) PCT Pub. No.: WO2010/111993
PCT Pub. Date: Oct. 7, 2010

(65) Prior Publication Data
US 2012/0099766 A1 Apr. 26, 2012

(30) Foreign Application Priority Data
Mar. 30, 2009 (DE) .......................... 10 2009 003 697

(51) Int. Cl.
G06K 9/00 (2006.01)
G06T 7/00 (2006.01)
G08G 1/16 (2006.01)

(52) U.S. Cl.
CPC ............ *G06T 7/004* (2013.01); *G06K 9/00798* (2013.01); *G08G 1/16* (2013.01); *G06T 2207/30256* (2013.01); *G08G 1/167* (2013.01); *G06T 7/0085* (2013.01)
USPC .......................................................... 382/104

(58) Field of Classification Search
None
See application file for complete search history.

(56) References Cited

U.S. PATENT DOCUMENTS

| | | | |
|---|---|---|---|
| 5,301,115 A | 4/1994 | Nouso | |
| 5,555,312 A * | 9/1996 | Shima et al. | 382/104 |
| 5,991,427 A | 11/1999 | Kakinami | |
| 7,583,816 B2 * | 9/2009 | Kakinami et al. | 382/104 |
| 8,204,277 B2 * | 6/2012 | Zhang et al. | 382/104 |
| 8,289,142 B2 * | 10/2012 | Pawlicki et al. | 340/435 |
| 8,456,327 B2 * | 6/2013 | Bechtel et al. | 340/937 |

(Continued)

FOREIGN PATENT DOCUMENTS

| | | |
|---|---|---|
| DE | 60101775 T2 | 12/2004 |
| DE | 102005044981 A1 | 3/2007 |

(Continued)

OTHER PUBLICATIONS

German Search Report mailed Jan. 13, 2010, in related Application No. DE 10 2009 003 697.0 (with partial English translation).

(Continued)

*Primary Examiner* — Stephen R Koziol
*Assistant Examiner* — Sean Conner
(74) *Attorney, Agent, or Firm* — RatnerPrestia

(57) ABSTRACT

A lane detection method wherein a digitized image of a lane is evaluated, including the following steps: detecting edges in the image, determining the angles of the detected edges with respect to a reference edge, removing the edges from the plurality of detected edges, the angle of which lies within a predetermined angle sector, and detecting the lane based on the remaining edges of the plurality of detected edges.

10 Claims, 4 Drawing Sheets

(56) References Cited

U.S. PATENT DOCUMENTS

| | | | |
|---|---|---|---|
| 2002/0061123 A1* | 5/2002 | Akutagawa | 382/104 |
| 2003/0103650 A1* | 6/2003 | Otsuka et al. | 382/104 |
| 2003/0235327 A1* | 12/2003 | Srinivasa | 382/104 |
| 2005/0209748 A1* | 9/2005 | Watanabe et al. | 701/23 |
| 2006/0239509 A1* | 10/2006 | Saito | 382/104 |
| 2008/0007619 A1* | 1/2008 | Shima et al. | 348/118 |
| 2009/0028388 A1* | 1/2009 | Amagasaki | 382/104 |
| 2010/0054538 A1* | 3/2010 | Boon | 382/104 |
| 2010/0086211 A1* | 4/2010 | Kuehnle et al. | 382/195 |

FOREIGN PATENT DOCUMENTS

| | | |
|---|---|---|
| EP | 1320072 A2 | 6/2003 |
| EP | 1873716 A1 | 1/2008 |
| WO | 2008089965 A2 | 7/2008 |

OTHER PUBLICATIONS

International Search Report issued in PCT/DE2010/000303 filed Mar. 18, 2010, mailed Aug. 26, 2010.

Kamijo, M. et al., "Lane Indication/Recognition System by Using Image Sensors: Evaluation of Indication Performance of Lane Marks in the Real World," TRB Annual Meeting, Jan. 1, 2003, 17 pp, (http://ww.ltrc.Isu.edu/TRB_82/TRB2003-001515.pdf>).

* cited by examiner

METHOD AND DEVICE FOR LANE DETECTION

CROSS REFERENCE TO RELATED APPLICATIONS

This application is the U.S. National Phase Application of PCT International Application No. PCT/DE2010/000303, filed Mar. 18, 2010, which claims priority to German Patent Application No. 10 2009 003 697.0, filed Mar. 30, 2009, the contents of such applications being incorporated by reference herein.

FIELD OF THE INVENTION

The invention relates to a method and device for lane detection wherein a digitized image of a lane is evaluated, comprising the following steps: detecting edges in the image, determining the angles of the detected edges with respect to a reference edge, removing the edges from the plurality of detected edges, the angles of which lie within a predetermined angle sector, and detecting the lane based on the remaining edges of the plurality of detected edges; a device for lane detection, which for evaluating a digitized image of a lane is configured such that it comprises the following steps: detecting edges in the image, determining the angles of the detected edges with respect to a reference edge, removing the edges from the plurality of detected edges, the angle of which lies within a predetermined angle sector, and detecting the lane based on the remaining edges of the plurality of detected edges.

BACKGROUND OF THE INVENTION

Increasingly, driver assistance systems are used in vehicles, which support the driver in keeping the vehicle on the lane. Assistance systems, which warn the driver when unintentionally departing the vehicle lane are called in English Lane-Departure Warning Systems (LDWS). Systems, which can directly intervene in the steering, are called in English Lane Keeping Systems (LKS). In German, these systems generally are referred to as a lane keeping assistance systems.

Lane keeping assistance systems are usually in the position to detect the lane in front of a vehicle (so-called lane detection), thus in particular the road course. Particularly, the lane keeping assistance systems estimate the lane width, the horizontal and/or vertical road curvature, the offset from the lane center as well as the pitch and yaw angle of the vehicle. From these system parameters, the time until departure of the lane can be calculated, and the driver can be warned of an unintended departure of the lane or the vehicle can be kept in lane with the aid of an electric steering or a specific ESP-intervention (Electronic Stability Program).

The above system dimensions can be determined in particular by a digital image processing of the position in front of the vehicle detected by an optical sensor, for example a CMOS camera. For this purpose, a special image processing algorithm is used, which evaluates structures in the detected images, which are characteristic of a vehicle lane and its course, for example road markings or boundaries of a road such as guardrails and the like. The correct functioning of a lane keeping assistance system based on such an image processing depends mainly on the fact that in the detected digital images the structures essential for the lane detection are detected reliably and accurately. The used image processing algorithm detects markings mainly as a result of dark-bright/ bright-dark transitions between the road and lane markings. Further, the images are searched for structures with the highest contrast, since these are mostly generated by said transitions. If, however, in the images structures with a high contrast appear, which are not generated by lane markings, this may lead to the fact that the image processing algorithms either does not correctly detect a lane, or is not in a position at all to detect a lane. EP 1320072 A2, which is incorporated by reference, discloses a method for detecting lane markings, wherein from an image edges with the corresponding angle are extracted. Further, those edges are extracted, which are aligned to a vanishing point. From this edges lane markings are determined.

SUMMARY OF THE INVENTION

It is, therefore, an aspect of the present invention proposes a method and a device for lane detection, which enable a lane detection which is improved in relation to the above-mentioned image processing algorithms.

This aspect is achieved by a lane detection method with the features wherein a digitized image of a lane is evaluated, comprising the following steps: detecting edges in the image, determining the angles of the detected edges with respect to a reference edge, removing the edges from the plurality of detected edges, the angles of which lie within a predetermined angle sector, and detecting the lane based on the remaining edges of the plurality of detected edges and a device for lane detection, which for evaluating a digitized image of a lane is configured such that it comprises the following steps: detecting edges in the image, determining the angles of the detected edges with respect to a reference edge, removing the edges from the plurality of detected edges, the angle of which lies within a predetermined angle sector, and detecting the lane based on the remaining edges of the plurality of detected edges.

An essential idea of the invention is to improve the lane detection by identifying reflections on a roadway, which often barely differ from the structures essential for lane detection, and which are mostly generated on particularly wet roads by the headlights and tail lights of preceding vehicles. Such reflections similar to road markings have characteristic bright/dark transitions and moreover often have a similar width as road markings. Therefore, there is a danger that these reflections are incorrectly classified by conventional lane keeping assistance systems as markings relevant for the lane detection, what can substantially affect the functioning of the lane keeping assistance systems, as explained above. On this basis, now according to a basic idea of the invention reflections are detected by identifying exactly those markings among the markings contained in an image and characteristic for the lane detection, which have an orientation, which significantly differs from the orientation of typical lane markings, in the digitized image such as for example a nearly vertical course, as these markings with a high probability are caused by reflections of headlights on a particularly wet road. Such identified markings can then be separated from the other markings in the image and can be rejected for a lane detection. This allows the lane detection to be improved in particular in case of wet roads.

The invention now relates according to a form of embodiment to a lane detection method wherein a digitized image of a lane is evaluated, comprising the following steps:
detecting edges in the image,
determining the angles of the detected edges with respect to a reference edge, removing the edges from the plurality of detected edges, the angles of which lie within a predetermined angle sector, and detecting the lane based on the remaining edges of the plurality of detected edges.

The determination of the angle of each edge allows for a classification of edges and thus for an improvement of the lane detection, as the edges unsuitable for the detection can be removed. By determining the angle of detected edges especially those edges can be determined, which with respect to the horizon in the image have an almost vertical orientation and therefore based on the above-described basic idea were generated most likely by reflections of headlights from other vehicles on a particularly wet road.

In order to reliably detect in particular the edges, generated by reflections of headlights from other vehicles on a particularly wet lane and mostly nearly vertical, the reference edge can be a vertical edge in the image, which is rotated by a predetermined roll angle of a vehicle. The roll angle be detected for example by an appropriate sensor and can be considered for the algorithmic rotation of the intrinsically vertical reference edge.

The predetermined angle sector can be configured particularly such that it comprises all edges, whose orientation corresponds to about the orientation of the reference edge. Above all, the angle sector can be selected such that also edges are classified as edges to be removed, whose orientation in the image does not exactly coincide with the orientation of the reference edge, but with respect to the orientation of the reference edge is tilted, but not tilted in such manner that they could be for example the edge markings or guardrails of the lane.

The edge detection can comprise above all a horizontal and then a vertical edge filtering of a region of the image to determine pairs of horizontal and vertical edge components each pertaining to an edge, and determining of the angles of the detected edges can include calculation of the arc tangent of the quotient of the horizontal and vertical edge components of each pair of edges in the region of the image.

The horizontal and vertical edge filtering allows for determining the horizontal and vertical components of edges in the image, from which in turn using the arc tangent the angle between each edge and the image horizon can be calculated. Such an approach leads to relatively accurate results of the edge angles.

The method can also be embodied such that in a detection mode of an automatic lane detection the removal of edges takes place only if a vehicle using the automatic lane detection is located on the lane. Here, it is assumed that it is only useful to perform an edge removal, if the vehicle is located on the lane, as a lane marking, for example the central reserve of a multilane road, usually appears vertically on the image only if the vehicle is located approximately in the middle of the road marking. In other words, almost vertical edges in the image can be removed for the lane detection, if the vehicle is located in the lane, as with a very high probability it is assumed that nearly vertical edges in the image result from reflections and an application of the edge removal makes sense according to aspects of the invention.

If an automatic lane detection is operated in a tracking mode, an edge direction to be expected can be determined from the prediction. Therefore, in the tracking mode it can be provided that the removal of an edge is to be effected only if the difference between the angle of the edge, the angle of which lies within the predetermined angle sector, and a predicted orientation exceeds a predetermined threshold.

Furthermore, in a histogram-based tracking mode those regions can be masked out by the edge removal, in which there are edges, in which the difference between the angle of the edge, the angle of which lies within the predetermined angle sector, and the predicted orientation exceeds the predetermined threshold.

A further form of embodiment of the invention relates to a device for lane detection which for evaluating a digitized image of a lane is configured such that it performs the following steps:

detecting edges in the image, determining the angles of the detected edges with respect to a reference edge, removing the edges from the plurality of detected edges, the angles of which lie within a predetermined angle sector, and detecting the lane based on the remaining edges of the plurality of detected edges.

The device can further be embodied according to a form of embodiment of the invention to perform a method according to aspects of the invention and as explained above.

Furthermore, the invention relates according to a form of embodiment to an automatic lane changing warning system or lane keeping system, which comprises a device according to the invention as described above.

Finally, the invention relates according to a form of embodiment to a vehicle with an automatic lane changing warning system or lane keeping system according to aspects of the invention as described above.

Further advantages and applications of the present invention will become apparent from the ensuing description in connection with the examples of embodiment shown in the drawings.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
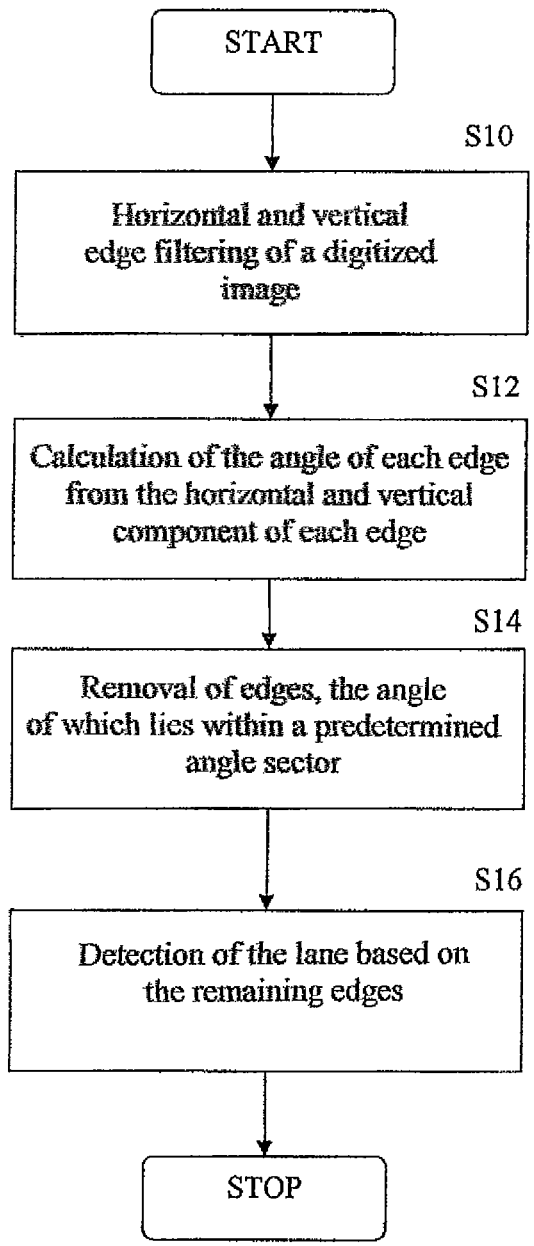
FIG. 1 a flow chart of a lane detection method according to aspects of the invention.

In the following identical and/or functionally identical elements can be provided with identical reference numerals. The absolute values and dimensions indicated hereinafter are only exemplary values and do not restrict the invention to such dimensions.

The lane detection method outlined in FIG. 1 based on a flow chart is implemented in particular as an algorithm, which is integrated into an embedded software, which is implemented in a lane keeping assistance system. The lane detection algorithm evaluates images detected and digitized for example by a CCD (Charged Coupled Device)- or CMOS (Complementary Metal Oxide Semiconductor) image sensor which show a situation in front of a vehicle, in which the image sensor is installed in a camera of a lane keeping assistance system. A detected lane or its course can then be used for example to warn of an inadvertent lane change or for an active steering intervention.

In the flow diagram shown in FIG. 1 in step S10 a horizontal and vertical edge filtering of a digitized image is performed for example by means of a sobel filter. To this end, at first the horizontal and then the vertical edge filtering of an image region is performed, which can also comprise the entire image. As a result of the filtering related pairs of horizontal and vertical components of edges can be obtained in the filtered image region. From these components, in step S12 for each edge its angle is calculated with respect to a reference edge, as is described in more detail later on the basis of FIG. 3. In a subsequent step S14, then the edges are removed from the plurality of detected edges, the angles of which lie within a predetermined angle section. Hence, in other words, edges with a specific orientation, in particular a nearly vertical orientation, are sorted out in the filtered image region, since these edges should not be used for the lane detection, as with a high probability they originate from reflections of the headlights of approaching vehicles. In the next step S16 then the lane is detected on the basis of the remaining edges, which with high probability result from road and lane markings.

Figure 2:
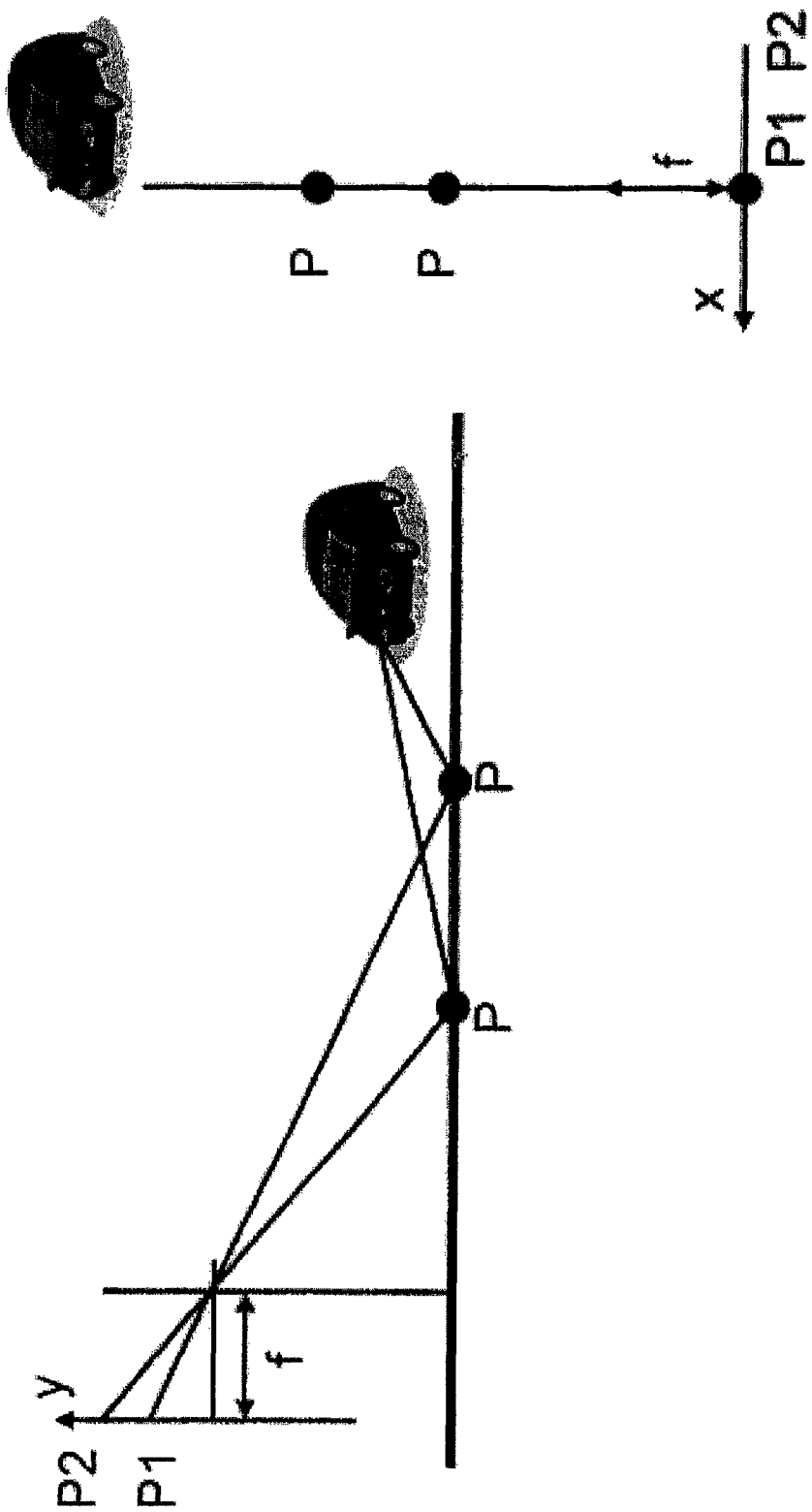
FIG. 2 a diagram illustrating the effect of headlight reflections on a lane detection.

In FIG. 2 it is shown what kind of edges are supposed to be particularly sorted out by the method outlined in FIG. 1, and how these edges are created in the digitized image. Edges, which are not to be used for lane detection according to aspects of the invention mainly originate from reflections of headlights or from other light sources on a particularly wet road. FIG. 2 shows that the headlights of a vehicle can create in the image such reflections with nearly vertical orientation. The headlights of the vehicle create cones of light in particular at the position P on a street. These cones of light are reflected in turn from the street to the points P1 and P2. The reflections generated in such manner run on an almost vertical line, as is shown in the right illustration in FIG. 2, which optionally is rotated by a roll angle of the vehicle. Thus, in a digitized image and/or sequence of images these reflections appear as almost vertical lines, which especially at dawn or in darkness appear with a high contrast in the image and therefore generate very characteristic bright-dark/dark-bright transitions, which can mistakenly be interpreted as lane or road markings by a conventional lane keeping assistance system.

Figure 3:
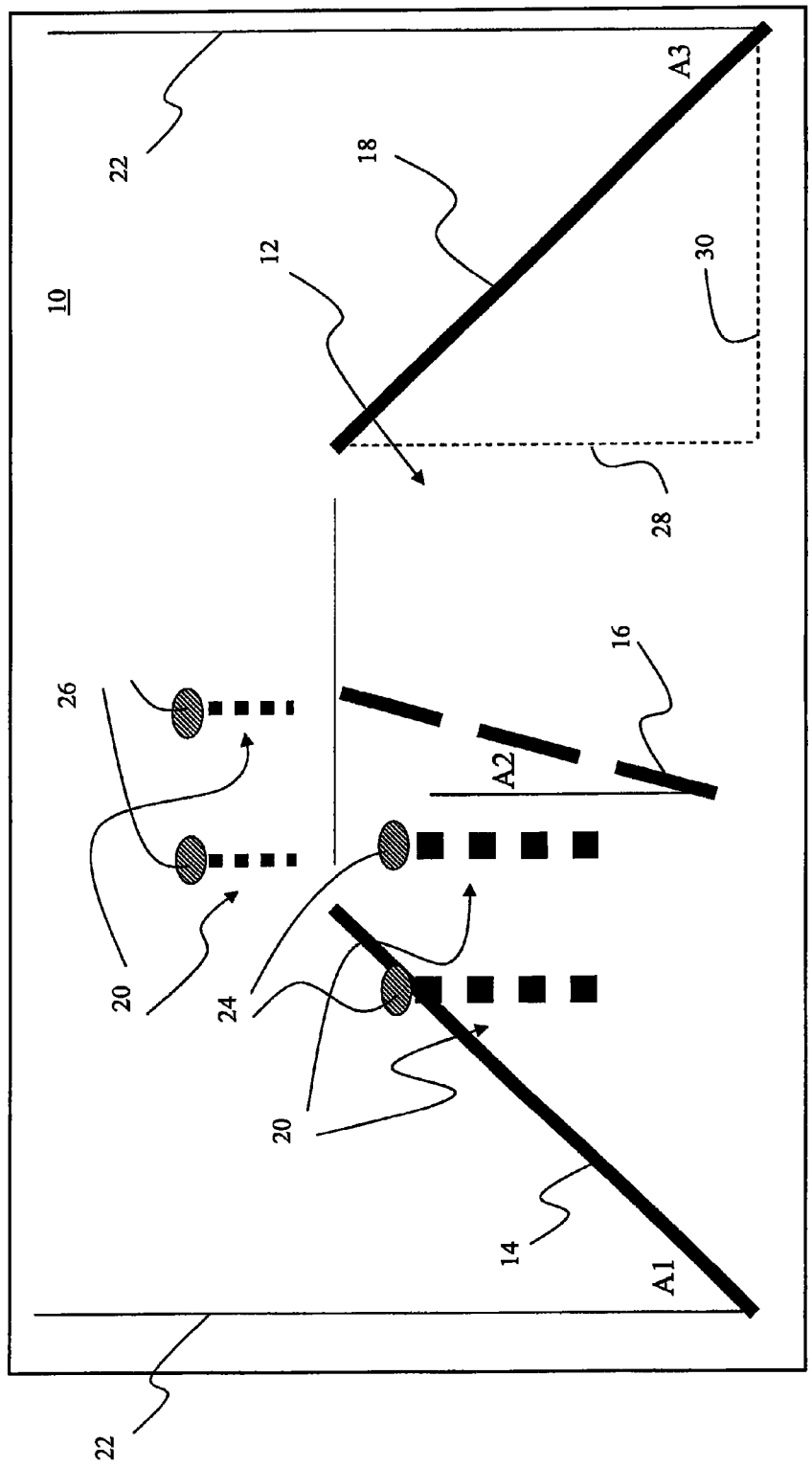
FIG. 3 an example of a digitized image of a region in front of a vehicle, which was detected with a camera of a lane keeping assistance system, and the elements in the image relevant for a lane detection according to aspects of the invention.

FIG. 3 shows a digitized image 10 in a situation in front of a vehicle, as it is detected for example by a CCD or CMOS image sensor of a lane keeping assistance system. Based on this image it is now explained in detail how an automatic lane detection works with the method according to aspects of the invention. The digitized image 10 reproduces a scene at night and includes several markings 14, 16, 18, 20, 24 and 26 in form. The markings 14 and 18 are road boundary markings. The marking 16 is a central reserve marking of the road and delimits the own lane 12 of the vehicle with the lane keeping assistance system from the opposite lane, on which two vehicles are approaching. Of the two vehicles the headlights 24 of the first vehicle and the headlights 26 of the second vehicle following the first are visible. Since the road is wet, the lights of the headlights 24 and 26 create approximately vertical markings 20 in the image 10. For the lane keeping assistance system the markings 20 due to the approximately identical contrast as the markings 14, 16 and 18 appear as normal road markings, unless the method according to aspects of the invention is used for classifying the markings in FIG. 10.

Each of the elongated markings 14, 16, 18 and 20 is now carefully examined with regard to its orientation in the image 10. For this purpose, first a horizontal edge filtering of the image 10 and then a vertical edge filtering of the image 10 each is performed with a sobel filter. With the edge filterings bright-dark/dark-bright transitions are filtered from the digital image data. The horizontal edge filtering results here in a plurality of horizontal components of the edges 14, 16, 18 and 20 generated by the markings in image 10, and the vertical edge filtering results in a plurality of vertical edge components. These components are sorted in pairs, so that for each marking 14, 16, 18 and 20 one pair of components results each. For the right road boundary marking 18, the horizontal edge component 30 and the vertical edge component 28 are shown.

For determining the orientation of the edges 14, 16, 18 and 20 now their angles are determined with respect to a vertical reference edge 22. The angles are determined by calculating the arc tangent of the quotient of the horizontal and vertical edge components of each pair of edges. For the edges 14, 16 and 18 the angles A1, A2 and A3 result, whereas for the edges 20 angles of approximately 0° result. If necessary, the calculated angles are further corrected by the roll angle of the vehicle with the lane keeping assistance system. The roll angle can be measured for example by a sensor and can be supplied to the lane keeping assistance system for further processing. For the removal of the edges 20 unsuitable for the reliable and accurate lane detection, which are generated by the reflections of the headlights 24 and 26 on the wet road, an angle section of approximately ±Δ is predetermined. Here, Δ is chosen such that nearly vertical edges in the image 10 can be reliably sorted out, for example 5°. For each calculated angle it is then checked whether the angle lies within the predetermined angle section. The angles A1, A2 and A3 lie outside the angle section, whereas the angles of the edge 20 lie within the predetermined angle section. The edges 20, the angles of which lie in the predetermined angle section, are then removed from the plurality of the detected edges in the image 10. Therefore, the lane detection uses only the edges 14, 16 and 18 for the lane detection, what leads to more accurate and reliable results than with a lane detection, which evaluates all edges 14, 16, 18 and 20.

Figure 4:
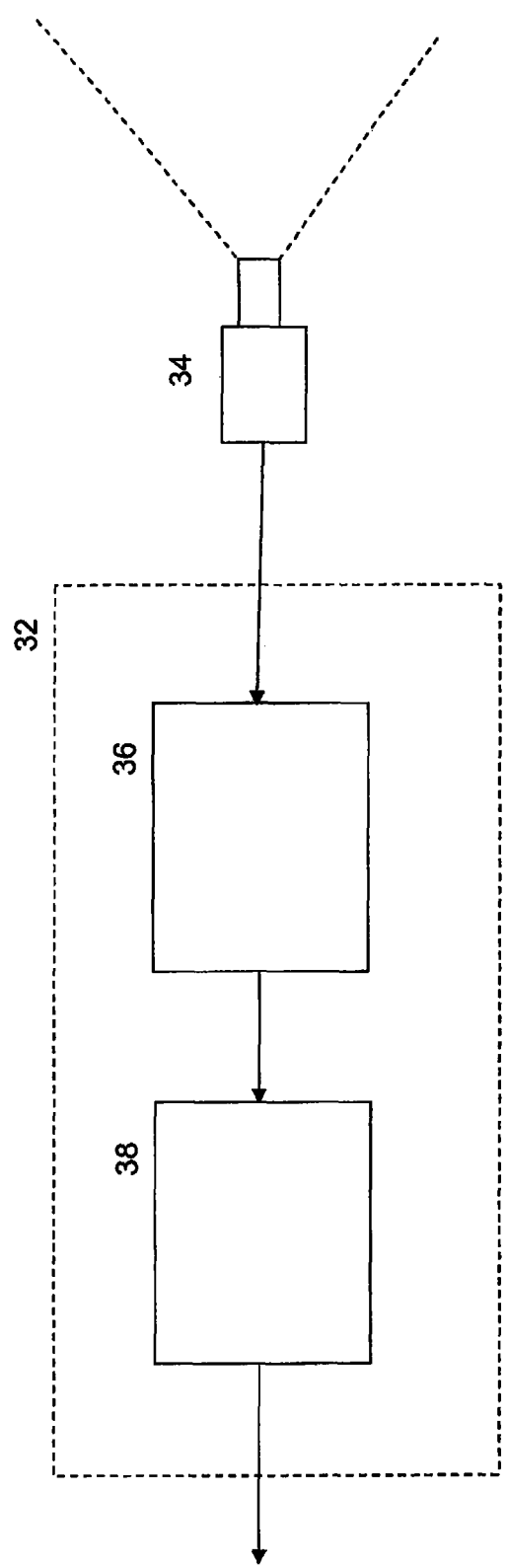
FIG. 4 a simple block diagram of an example of embodiment of a device according to aspects of the invention.

FIG. 4 shows a lane detection device 32 for processing the digitized images detected by a vehicle camera 34. The device 32 comprises edge filtering means 36, which can be implemented for example by an FPGA (Field Programmable Gate Array). The edges determined by the edge filtering are supplied to edge evaluation means 38. The edge evaluation means 38 can for example be implemented by a powerful microprocessor, which is configured by a special program such that it can implement the method according to aspects of the invention, as it is shown for example in FIG. 1 based on a flow chart. The correspondingly configured microprocessor therefore first removes from the received edges those which are unsuitable for the lane detection, as it is described for example above in connection with the image 10 shown in FIG. 3. If the image data are no longer available in the evaluation, as they were calculated for example with an external FPGA, the processor can review the pairs of edges generated by the horizontal and vertical edge filtering also as to whether they are arranged one above the other. If this is the case and if the orientations of a prediction of the lane and the measurements lying one below each other (the orientation of measurements lying above each other can be determined for example by a regression) differ by a threshold, then they can be rejected. Subsequently, the processor performs a lane detection with the remaining edges and provides corresponding data with regard to the detected lane for further processing by for example a lane keeping assistance system.

REFERENCE NUMERALS

10 Digitized image of a scene in front of a vehicle
12 Lane of the vehicle using the lane detection
14 Left road boundary marking
16 Central reserve marking
18 Right road boundary marking
20 Markings generated by reflections of the headlights of approaching vehicles
22 Reference edge
24 First approaching vehicle
26 Second approaching vehicle
28 Vertical edge component of the right road boundary marking
30 Horizontal edge component of the right road boundary marking
32 Lane detection device
34 Camera
36 Edge filtering means
38 Edge evaluation means
S10-S16 Process steps

The invention claimed is:

1. A lane detection method, wherein a digitized image of a lane in which a vehicle is traveling is evaluated, comprising the following steps:
   detecting edges in the image by performing horizontal edge filtering and vertical edge filtering which produce horizontal edge components and vertical edge components,
   determining angles of the detected edges with respect to a vertical reference edge, by computing a quotient of the horizontal edge components and the vertical edge components,
   determining an orientation of the detected edges in the image;
   removing nearly vertical edges from the plurality of detected edges when the vehicle is located in the lane, the nearly vertical edges having angles which lie within a predetermined angle section with respect to the vertical reference edge, wherein the angles of the nearly vertical edges differ from the vertical reference edge by a predetermined threshold such that the orientations of the nearly vertical edges do not exactly coincide with an orientation of the vertical reference edge;
   maintaining the nearly vertical edges from the plurality of detected edges when the vehicle is located outside of the lane; and
   detecting the lane based on the nearly vertical edges that have been maintained and the remaining edges of the plurality of detected edges, the remaining edges having angles which lie outside the predetermined angle section with respect to the vertical reference edge.

2. A method according to claim 1, wherein the reference edge is a vertical edge in the image, which is rotated by a predetermined roll angle of a vehicle.

3. A method according to claim 1, wherein the predetermined angle section is configured such that it comprises all edges, the orientation of which corresponds to approximately the orientation of the reference edge.

4. A method according to claim 1, wherein the detection of edges comprises a horizontal and then a vertical edge filtering of a region of the image in order to determine pairs of horizontal and vertical edge components each pertaining to an edge, and that determining of the angles of the detected edges, includes calculation of the arc tangent of the quotient of the horizontal and vertical edge component of each pair of edges in the region of the image.

5. A method according to claim 1, wherein in a detection mode of an automatic lane detection removal of the edges takes place only if a vehicle using the automatic lane detection is located on the lane.

6. A method according to claim 4, wherein in a histogram-based tracking mode regions are masked out by the edge removal, in which there are edges, in which the difference between the angle of the edge, the angle of which lies within the predetermined angle section, and a predicted orientation exceeds the predetermined threshold.

7. A device for lane detection, which includes a processor for evaluating a digitized image of a lane in which a vehicle is traveling is configured such that it comprises the following steps:
   detecting, by the processor, edges in the image by performing horizontal edge filtering and vertical edge filtering which produce horizontal edge components and vertical edge components,
   determining, by the processor, angles of the detected edges with respect to a vertical reference edge, by computing a quotient of the horizontal edge components and the vertical edge components,
   determining, by the processor, an orientation of the detected edges in the image;
   removing, by the processor, nearly vertical edges from the plurality of detected edges when the vehicle is located in the lane, the nearly vertical edges having angles which lie within a predetermined angle section with respect to the vertical reference edge, wherein the angles of the nearly vertical edges differ from an angle of the vertical reference edge by a predetermined threshold such that the orientations of the nearly vertical edges do not exactly coincide with an orientation of the vertical reference edge;
   maintaining the nearly vertical edges from the plurality of detected edges when the vehicle is located outside of the lane; and
   detecting, by the processor, the lane based on the nearly vertical edges that have been maintained and the remaining edges of the plurality of detected edges, the remaining edges having angles which lie outside the predetermined angle section with respect to the vertical reference edge.

8. An automatic lane detection system, which comprises a device according to claim 7 and which delivers lane data.

9. A lane changing warning system and lane keeping system, which comprises an automatic lane detection system according to claim 8 and which processes the delivered lane data to detect a lane change.

10. A vehicle with an automatic lane change warning system or lane keeping system according to claim 9.

* * * * *